United States Patent
Rana (10) Patent No.: US 12,418,317 B2
(45) Date of Patent: Sep. 16, 2025

(54) INTERFERENCE DETECTION AND REJECTION IN A COMMUNICATION/NAVIGATION NARROWBAND AND WIDEBAND RADIO

(71) Applicant: Honeywell International Inc., Charlotte, NC (US)

(72) Inventor: Narayan Singh Rana, Bangalore (IN)

(73) Assignee: Honeywell International Inc., Charlotte, NC (US)

( * ) Notice: Subject to any disclaimer, the term of this patent is extended or adjusted under 35 U.S.C. 154(b) by 406 days.

(21) Appl. No.: 18/052,126

(22) Filed: Nov. 2, 2022

(65) Prior Publication Data
US 2024/0097726 A1     Mar. 21, 2024

(30) Foreign Application Priority Data
Sep. 20, 2022   (IN) .............................. 202211053757

(51) Int. Cl.
*H04B 1/10*   (2006.01)
*H04B 1/04*   (2006.01)

(52) U.S. Cl.
CPC ......... *H04B 1/1036* (2013.01); *H04B 1/0458* (2013.01); *H04B 2001/0408* (2013.01); *H04B 2001/1063* (2013.01)

(58) Field of Classification Search
CPC .. H04B 1/1036; H04B 1/0458; H04B 1/1027; H04B 2001/0408; H04B 2001/1063
See application file for complete search history.

(56) References Cited

U.S. PATENT DOCUMENTS 7,116,958 B1   10/2006   Brown et al.
7,142,818 B2   11/2006   Hunter et al.
(Continued)

FOREIGN PATENT DOCUMENTS

CN   107015206 A   8/2017
EP   1269639 B1    5/2007

OTHER PUBLICATIONS

European Patent Office, "Extended European Search Report", dated Mar. 11, 2024, from EP Application No. 23194448.9, from Foreign Counterpart to U.S. Appl. No. 18/052,126, pp. 1 through 8, Published: EP.

(Continued)

*Primary Examiner* — Siu M Lee
(74) *Attorney, Agent, or Firm* — Fogg & Powers LLC (57) ABSTRACT

A system comprises a radio receiver including an antenna, tunable RF notch filters that receive a desired RF signal and reject an interference signal, a LNA, a splitter, and a processor. A received RF signal is divided by the splitter and directed along a main signal path and an interference detection path. The interference detection path comprises a mixer that converts the received RF signal to an IF band, a synthesizer, and a SAW filter in communication with the mixer. The SAW filter rejects any IF signal generated due to a desired received RF signal and improves an accuracy/resolution of a detected interference frequency. The processor estimates the interference frequency based on a detected amplitude of signal samples and a synthesizer tuned frequency for that amplitude. If the detected amplitude is more than a threshold, then a control signal is sent to configure the notch filters at the interference frequency.

20 Claims, 3 Drawing Sheets

(56) References Cited

U.S. PATENT DOCUMENTS

| | | | |
|---|---|---|---|
| 7,194,050 B2 | 3/2007 | Nicholls et al. | |
| 8,711,993 B2 | 4/2014 | Malaga et al. | |
| 9,042,502 B2 | 5/2015 | Malaga et al. | |
| 9,800,277 B2 | 10/2017 | Sim et al. | |
| 9,882,669 B1 | 1/2018 | Schwartzman | |
| 11,175,376 B2 | 11/2021 | Melzer et al. | |
| 11,327,585 B1* | 5/2022 | Das | G06F 3/04162 |
| 2002/0154614 A1* | 10/2002 | Jagger | H04B 1/7103 |
| | | | 370/332 |
| 2006/0205346 A1* | 9/2006 | Evans | H04B 7/18513 |
| | | | 455/12.1 |
| 2014/0177748 A1 | 6/2014 | Malaga et al. | |
| 2014/0269606 A1* | 9/2014 | Abdelmonem | H04L 5/0026 |
| | | | 370/330 |
| 2017/0324434 A1* | 11/2017 | Utter | H04B 1/1036 |
| 2020/0389149 A1* | 12/2020 | Gudeman | H03H 9/02976 |
| 2022/0209805 A1 | 6/2022 | Yu et al. | |
| 2023/0266475 A1* | 8/2023 | Yu | G01S 19/33 |

OTHER PUBLICATIONS

Lin et al., "A Low-Power Adaptive Receiver Utilizing Discrete-Time Spectrum-Sensing", IEEE Transactions on Microwave Theory and Techniques, vol. 61, No. 3, Mar. 2013, pp. 1338 through 1346.

\* cited by examiner

INTERFERENCE DETECTION AND REJECTION IN A COMMUNICATION/NAVIGATION NARROWBAND AND WIDEBAND RADIO

CROSS-REFERENCE TO RELATED APPLICATION

This application claims priority to Indian Provisional Application No. 202211053757, filed on Sep. 20, 2022, the contents of which are incorporated by reference herein in their entirety.

BACKGROUND

In avionics communication and navigation radios, the common method for interference rejections uses Fast Fourier Transform (FFT)-based techniques or uses a narrowband intermediate frequency (IF) filter. While FFT-based techniques are popular in wideband receivers, the FFT-based techniques require high speed processing that result in use of high end costly processors and analog to digital converters. In addition, the narrowband IF filter can be used only in a narrowband receiver, and the cost of crystal filters used for narrowband IF filters is very high.

In aerial vehicles, such as urban air mobility (UAM) vehicles and unmanned aircraft systems (UAS) vehicles, there is a need for low cost solutions to signal interference rejection. Such low cost solutions can only be achieved by avoiding high cost processors and crystal filters as well as use of high end signal processing devices.

SUMMARY

A system comprises a radio receiver including at least one antenna configured to receive one or more radio frequency (RF) signals. The radio receiver comprises a first set of one or more tunable RF notch filters configured to receive a desired RF signal and reject an interference signal; a low-noise amplifier (LNA) in signal communication with an output of the one or more tunable RF notch filters; a splitter in signal communication with an output of the LNA; and a processor in operative communication with the one or more tunable RF notch filters. A received RF signal from the output of the LNA is divided by the splitter and directed along a main signal path and an interference detection path. The interference detection path comprises a first mixer in signal communication with a first output of the splitter and configured to convert the received RF signal from the splitter to an intermediate frequency (IF) band; a first synthesizer in signal communication with an input of the mixer, the synthesizer in operative communication with the processor; a surface acoustic wave (SAW) filter in signal communication with an output of the mixer, wherein the SAW filter is configured to reject any IF signal generated due to a desired received RF signal and to improve an accuracy and resolution of a detected interference frequency; an RF detector in signal communication with an output of the SAW filter; and a first analog-to-digital converter (ADC) in signal communication with an output of the RF detector, the first ADC in operative communication with the processor. The processor is operative to estimate the interference frequency based on a detected amplitude of signal samples from the first ADC and a synthesizer tuned frequency for that amplitude. If the detected amplitude of the signal samples is more than a threshold defined limit, then the processor sends a control signal to configure the one or more RF notch filters at the interference frequency.

BRIEF DESCRIPTION OF THE DRAWINGS

Features of the present invention will become apparent to those skilled in the art from the following description with reference to the drawings. Understanding that the drawings depict only typical embodiments and are not therefore to be considered limiting in scope, the invention will be described with additional specificity and detail through the use of the accompanying drawings, in which.

DETAILED DESCRIPTION

In the following detailed description, embodiments are described in sufficient detail to enable those skilled in the art to practice the invention. It is to be understood that other embodiments may be utilized without departing from the scope of the invention. The following detailed description is, therefore, not to be taken in a limiting sense.

A system and method for signal interference detection and rejection in a communication/navigation narrowband and wideband radio are disclosed.

The present approach can be implemented in both narrowband and wideband communication receivers. The present technique can be used in low cost communication radios for aerial vehicles, such as urban air mobility (UAM) vehicles and unmanned aircraft systems (UAS) vehicles, as well as business, general aviation (BGA) and regional aircraft.

The present approach avoids the use of costly high-end processors and crystal filters. For example, the present approach requires neither FFT implementation nor a narrowband IF crystal filter.

Further details regarding the present approach are described as follows and with reference to the drawings.

Figure 1:
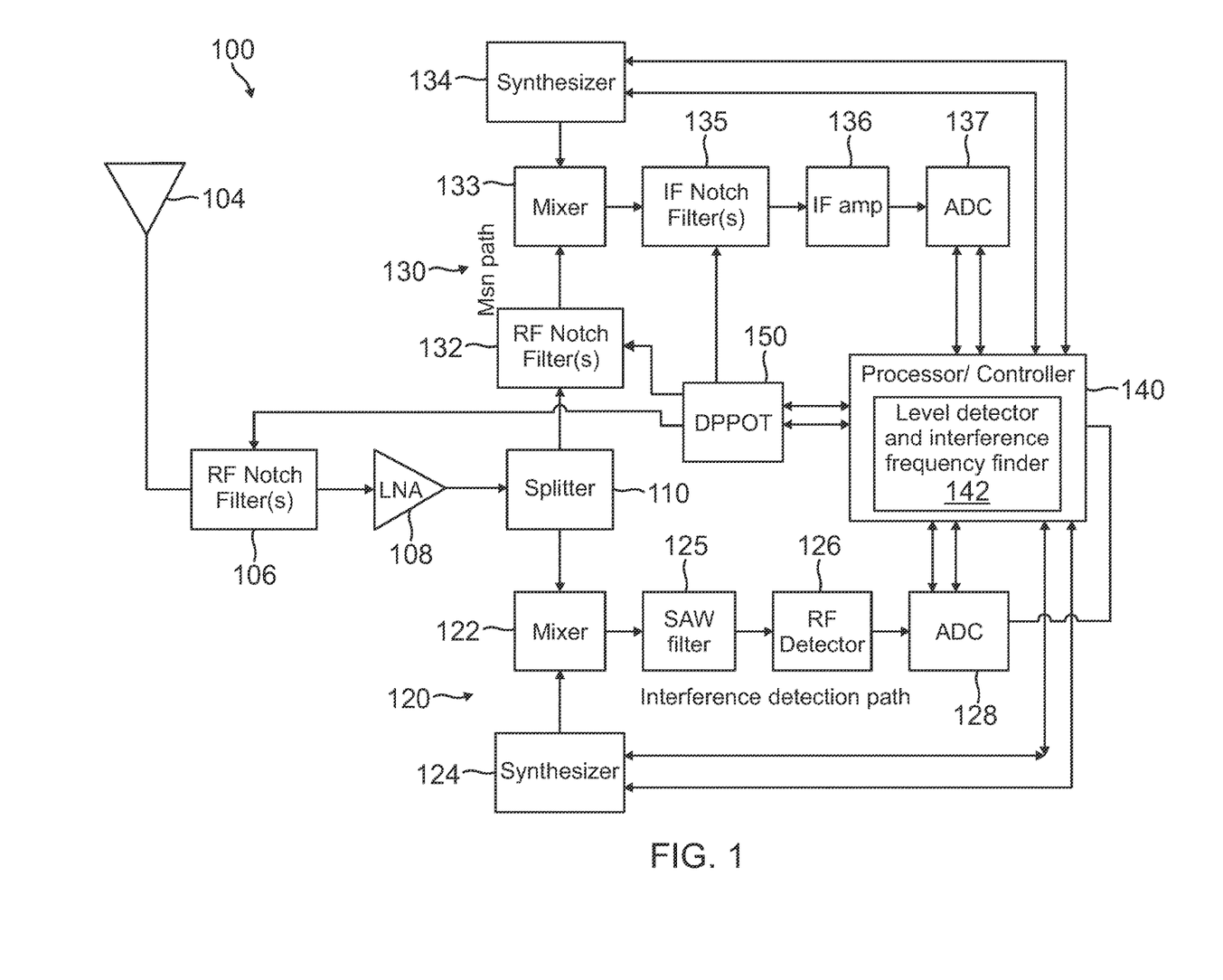
FIG. 1 is a block diagram of a radio system that provides signal interference detection and rejection, according to one embodiment.

FIG. 1 illustrates a radio system 100, which provides signal interference detection and rejection, according to one embodiment. The radio system 100 includes at least one antenna 104 configured to receive at least one radio frequency (RF) signal. In some implementations, antenna 104 is operable to receive a plurality of RF signals transmitted across a wide frequency band. In other implementations, antenna 104 is operable to receive a plurality of RF signals transmitted across a narrow frequency band. For example, the plurality of RF signals can be aviation signals having a frequency range from about 108-137 MHz. Exemplary aviation signals include navigation signals having a frequency range from about 108-118 MHz, and communication signals having a frequency range from about 118-137 MHz.

A first set of one or more tunable RF notch filters 106 is configured to receive the RF signals from antenna 104. The tunable RF notch filters 106 can be selectively configured to remove an interfering signal at a selected frequency while allowing all of the remaining signals to pass through. For example, tunable RF notch filters 106 can be configured to reject in-band and out-of-band interference signals, such as signals from FM stations, adjacent channels, and Simul Comm or Comm interlocking.

A low-noise amplifier (LNA) 108 is in signal communication with an output of tunable RF notch filters 106. The LNA 108 is configured to increase the signal strength of the selected RF frequency band, which prevents signal loss down the line in the receiver chain and minimizes the degradation of receiver Signal-to-Noise ratio.

A splitter 110 is in signal communication with an output of LNA 108. A received RF signal from the output of LNA 108 is divided by splitter 110 and directed along an interference detection path 120 and a main signal path 130. As described further hereafter, a processor/controller 140 is in operative communication with interference detection path 120 and main signal path 130.

The interference detection path 120 includes a first mixer 122 in signal communication with a first output of splitter 110. The first mixer 122 is configured to convert the received RF signal from splitter 110 to an intermediate frequency (IF) band. A first synthesizer 124 is in signal communication with an input of first mixer 122, and first synthesizer 124 is in operative communication with processor/controller 140. The first synthesizer 124 is operable to feed a local signal at a desired frequency to first mixer 122. The frequency generated by first synthesizer 124 can be controlled with processor/controller 140.

A narrowband surface acoustic wave (SAW) filter 125 is in signal communication with an output of mixer 122. The narrowband SAW filter 125 is configured to reject any IF signal generated due to a desired received RF signal, and improve the accuracy/resolution of the detected interference signal frequency. An RF detector 126 is in signal communication with an output of SAW filter 125. The RF detector 126 is configured to converts the RF signal to an equivalent DC signal. The amplitude of the detected DC signal depends on the input interference signal level and the out of pass band rejection offered by SAW filter 125.

A first analog-to-digital converter (ADC) 128 is in signal communication with an output of RF detector 126, and ADC 128 is in operative communication with processor/controller 140. The ADC 128 is configured to convert the RF signals from RF detector 126 to digital signals, which are sent to processor/controller 140.

The main signal path 130 includes a second set of one or more tunable RF notch filters 132 in signal communication with a second output of splitter 110. The tunable RF notch filters 132 can be selectively configured to remove an interfering signal at a selected frequency while allowing all of the remaining signals to pass through.

A second mixer 133 is in signal communication with an output of tunable RF notch filters 132. The second mixer 133 is configured to convert the received RF signal from tunable RF notch filters 132 to an IF band. A second synthesizer 134 is in signal communication with an input of second mixer 133, and synthesizer 134 is in operative communication with processor/controller 140. The second synthesizer 134 is operable to feed a local signal at a desired frequency to second mixer 133. The frequency generated by second synthesizer 134 can be controlled with processor/controller 140.

One or more tunable IF notch filters 135 are in signal communication with an output of mixer 133. The tunable IF notch filters 135 can be selectively configured to attenuate an interfering signal at a selected frequency while allowing all of the remaining signals in the IF band to pass un-attenuated. An IF amplifier 136 is in signal communication with tunable IF notch filter 135, and is configured to increase the signal strength of the remaining signals in the IF band.

A second ADC 137 is in signal communication with an output of IF amplifier 136, and second ADC 137 is in operative communication with processor/controller 140. The second ADC 137 is configured to convert the IF signals from IF amplifier 136 to digital signals, which are sent to processor/controller 140.

A digital potentiometer (DPPOT) 150 is in operative communication with processor/controller 140. In addition, DPPOT 150 is operative to send a control signal to tunable RF notch filters 106, tunable RF notch filters 132, and tunable IF notch filters 135, in order to configured the filters.

The processor/controller 140 includes a level detector and interference frequency finder module 142, which is operative to perform logic steps to estimate an interference frequency based on a detected amplitude of signal samples from first ADC 128 and a synthesizer tuned frequency from first synthesizer 124 for that amplitude. If the detected amplitude of the signal samples is more than a threshold defined limit, then processor/controller 140 sends a control signal to DPPOT 150, which in turn directs the control signal to tunable RF notch filters 106, tunable RF notch filters 132, and tunable IF notch filters 135 to adjust these filters to the appropriate interference frequency.

During operation, a received RF signal is divided between interference detection path 120 and main signal path 130. The processor/controller 140 tunes first synthesizer 124 to a wide frequency band except for the frequency at which second synthesizer 134 is tuned. The narrowband SAW filter 125 rejects any IF signal generated due to the desired received signal, and the bandwidth of SAW filter 125 limits the detection accuracy of the interference frequency. The ADC 128 output samples are fed to processor/controller 140, including the level detector and interference frequency finder module 142, which includes instructions executable by processor/controller 140, to perform an interference detection and rejection method. This method estimates the interference frequency based on the detected amplitude of signal samples from ADC 128 and the synthesizer tuned frequency from first synthesizer 124 for the detected amplitude. If the detected amplitude of the signal samples is more than the threshold defined limit, processor/controller 140 sends a control signal to configure all of the notch filters at the interference frequency. The notch filters are then set to the detected interference frequencies.

The position and number of notch filters can be determined based on the RF link budget and interference specifications. For example, a discrete bandpass filter (BPF) is a low cost SAW filter with a bandwidth of less than about 100 KHz. The synthesizer can perform coarse and fine tuning. A fine tuning algorithm can be used to make sure that the detected interference frequency is within +/−x KHz of accuracy. The x value depends upon the use of a low cost SAW filter and can be as low as about +/−25 KHz.

Figure 2:
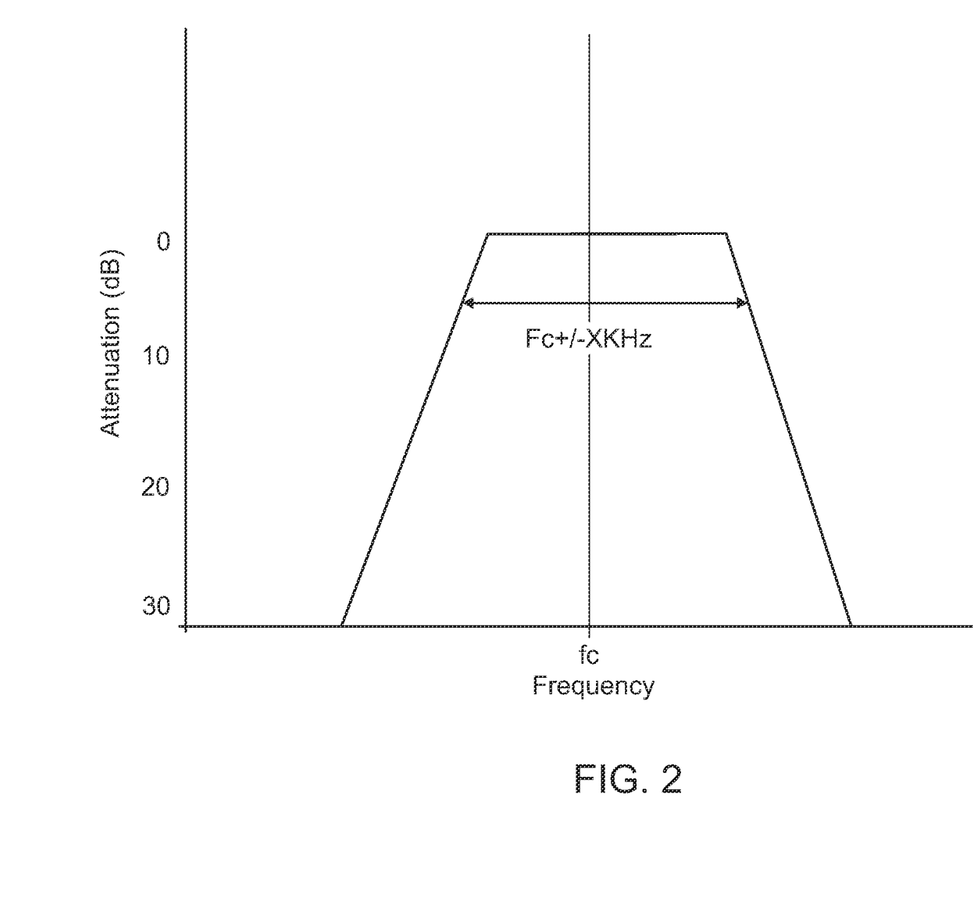
FIG. 2 is a graph showing the response of a narrowband surface acoustic wave (SAW) filter, which can be employed in the radio system of FIG. 1.

FIG. 2 is a graph showing the response of a narrowband surface acoustic wave (SAW) filter, such as can be employed in the radio system of FIG. 1. FIG. 2 shows the SAW filter response as attenuation (dB) with respect to frequency (fc).

Figure 3:
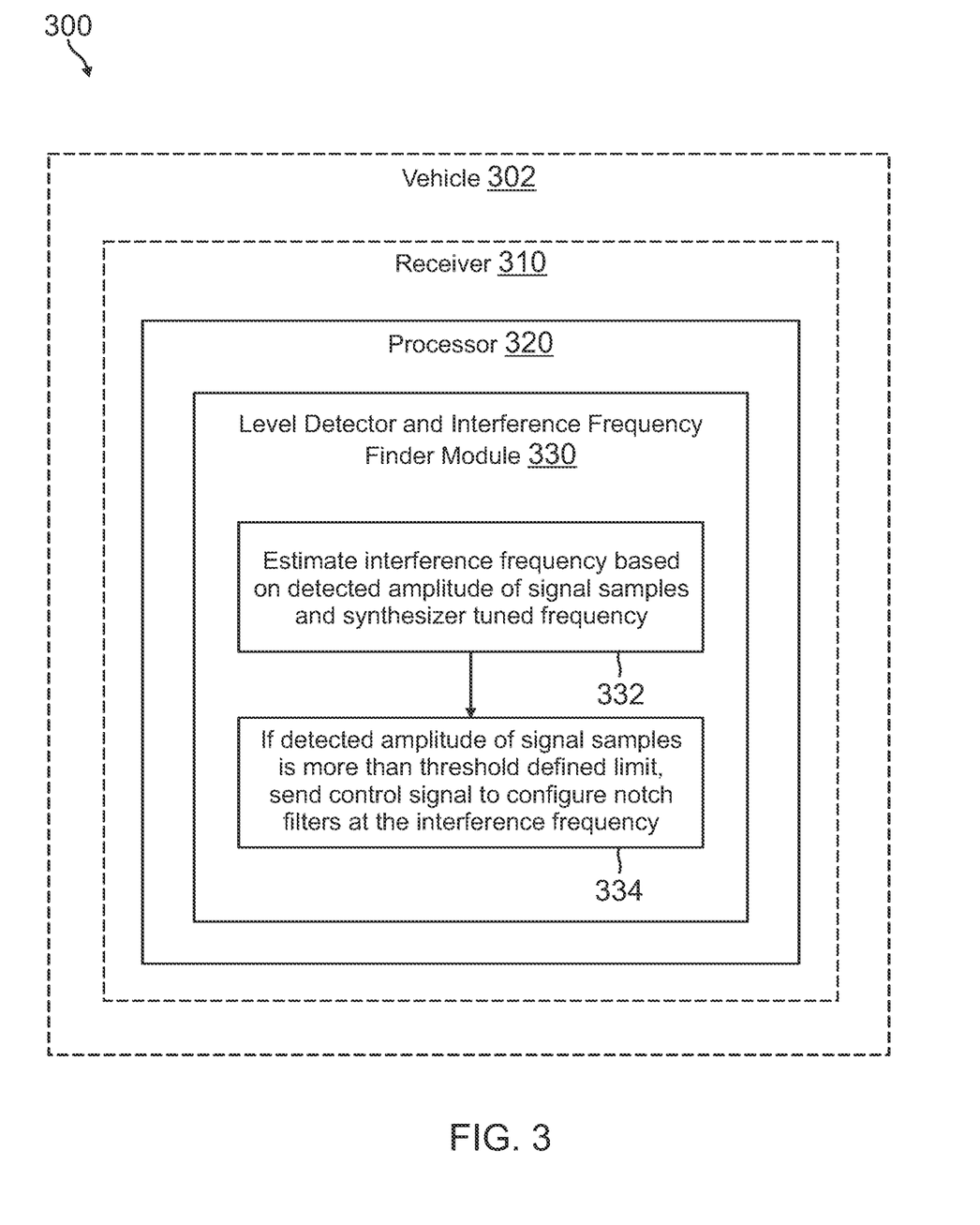
FIG. 3 is a block diagram of an example system for signal interference detection and rejection, which can be implemented for a vehicle.

FIG. 3 is a block diagram of an example system 300 for signal interference detection and rejection, which can be implemented for a vehicle 302 such as a UAM vehicle or UAS vehicle. The system 300 includes a radio receiver 310 mounted on vehicle 302 and configured to receive one or more RF signals. The receiver 310 includes similar components as discussed above for radio system 100, including tunable notch filters, an LNA in signal communication with the tunable notch filters, and a splitter in signal communication with an output of the LNA. A received RF signal from the LNA is divided by the splitter and directed along a main signal path and an interference detection path, which also includes similar components as discussed above for radio system 100.

The receiver 310 also includes a processor 320 in operative communication with the tunable notch filters. The processor 320 hosts a level detector and interference frequency finder module 330, which includes instructions executable by processor 320, to perform an interference detection and rejection method. This method estimates the interference frequency based on the detected amplitude of signal samples and a synthesizer tuned frequency (block 332), and determines if the detected amplitude of the signal samples is more than a threshold defined limit. If the detected amplitude of the signal samples is determined to be more than the threshold defined limit, processor 320 sends a control signal to configure all of the tunable notch filters at the interference frequency (block 334). The tunable notch filters are then set to the detected interference frequencies.

The processing units and/or other computational devices used in systems and methods described herein may be implemented using software, firmware, hardware, or appropriate combinations thereof. The processing unit and/or other computational devices may be supplemented by, or incorporated in, specially designed application-specific integrated circuits (ASICs) or field programmable gate arrays (FPGAs). In some implementations, the processing unit and/or other computational devices may communicate through an additional transceiver with other computing devices outside of the system, such as those associated with a management system or computing devices associated with other subsystems controlled by the management system. The processing unit and/or other computational devices can also include or function with software programs, firmware, or other computer readable instructions for carrying out various process tasks, calculations, and control functions used in the methods and systems described herein.

The methods described herein may be implemented by computer executable instructions, such as program modules or components, which are executed by at least one processor or processing unit. Generally, program modules include routines, programs, objects, data components, data structures, algorithms, and the like, which perform particular tasks or implement particular abstract data types.

Example Embodiments

Example 1 includes a system comprising: a radio receiver including at least one antenna configured to receive one or more radio frequency (RF) signals, the radio receiver comprising: a first set of one or more tunable RF notch filters configured to receive a desired RF signal and reject an interference signal; a low-noise amplifier (LNA) in signal communication with an output of the one or more tunable RF notch filters; a splitter in signal communication with an output of the LNA; and a processor in operative communication with the one or more tunable RF notch filters; wherein a received RF signal from the output of the LNA is divided by the splitter and directed along a main signal path and an interference detection path; wherein the interference detection path comprises: a first mixer in signal communication with a first output of the splitter and configured to convert the received RF signal from the splitter to an intermediate frequency (IF) band; a first synthesizer in signal communication with an input of the first mixer, the first synthesizer in operative communication with the processor; a surface acoustic wave (SAW) filter in signal communication with an output of the first mixer, wherein the SAW filter is configured to reject any IF signal generated due to the received RF signal, and to improve an accuracy and resolution of a detected interference frequency; an RF detector in signal communication with an output of the SAW filter; and a first analog-to-digital converter (ADC) in signal communication with an output of the RF detector, the first ADC in operative communication with the processor; wherein the processor is operative to estimate the interference frequency based on a detected amplitude of signal samples from the first ADC and a synthesizer tuned frequency for that amplitude, wherein if the detected amplitude of the signal samples is more than a threshold defined limit, then the processor sends a control signal to configure the one or more RF notch filters at the interference frequency.

Example 2 includes the system of Example 1, wherein the main signal path comprises: a second set of one or more tunable RF notch filters in signal communication with a second output of the splitter; a second mixer in signal communication with an output of the second set of one or more tunable RF notch filters, the second mixer configured to convert the received RF signal, from the second set of one or more tunable RF notch filters, to an IF band; a second synthesizer in signal communication with an input of the second mixer, the second synthesizer in operative communication with the processor; one or more tunable IF notch filters in signal communication with an output of the second mixer; an IF amplifier in signal communication with the one or more tunable IF notch filters; and a second ADC in signal communication with an output of the IF amplifier, the second ADC in operative communication with the processor.

Example 3 includes the system of Example 2, further comprising: a digital potentiometer in operative communication with the processor, wherein the digital potentiometer is operative to send a control signal to the first and second sets of one or more tunable RF notch filters, and the one or more tunable IF notch filters.

Example 4 includes the system of any of Examples 1-3, wherein the processor includes a level detector and interference frequency finder module, which includes instructions executable by the processor, to perform an interference detection and rejection method comprising: estimating the interference frequency based on the detected amplitude of signal samples from the first ADC and the synthesizer tuned frequency from the first synthesizer for the detected amplitude; if the detected amplitude of the signal samples is more than the threshold defined limit, sending the control signal to configure the first and second sets of one or more RF notch filters at the interference frequency.

Example 5 includes the system of any of Examples 1-4, wherein the radio receiver is mounted in a vehicle.

Example 6 includes the system of Example 5, wherein the vehicle is an aircraft.

Example 7 includes the system of any of Examples 5-6, wherein the vehicle comprises an urban air mobility (UAM) vehicle, or an unmanned aircraft systems (UAS) vehicle.

Example 8 includes the system of any of Examples 5-7, wherein the vehicle comprises business and general aviation (BGA) aircraft, or regional aircraft.

Example 9 includes the system of any of Examples 1-8, wherein the radio receiver is configured in a narrowband radio.

Example 10 includes the system of any of Examples 1-9, wherein the radio receiver is configured in a wideband radio.

Example 11 includes a method for signal interference detection and rejection, the method comprising providing a radio receiver onboard a vehicle for receiving one or more radio frequency (RF) signals, the radio receiver comprising a plurality of tunable RF notch filters that receive a desired RF signal and reject an interference signal, and a processor operatively coupled with the tunable RF notch filters; wherein the processor includes a level detector and interference frequency finder module that performs an interference detection and rejection method comprising: estimating an interference frequency based on a detected amplitude of signal samples from an analog-to-digital converter (ADC) and a synthesizer tuned frequency for the detected amplitude; if the detected amplitude of the signal samples is more than a threshold defined limit, sending a control signal to configure the RF notch filters at the interference frequency.

Example 12 includes the method of Example 11, wherein the vehicle is an aircraft.

Example 13 includes the method of any of Examples 11-12, wherein the vehicle comprises an urban air mobility (UAM) vehicle, or an unmanned aircraft systems (UAS) vehicle.

Example 14 includes the method of any of Examples 11-12, wherein the vehicle comprises business and general aviation (BGA) aircraft, or regional aircraft.

Example 15 includes the method of any of Examples 11-14, wherein the radio receiver includes an interference detection path comprising: a mixer in signal communication with a splitter so as to receive a first portion of the one or more RF signals, wherein the mixer converts the first portion of the one or more RF signals to a first intermediate frequency (IF) band; a synthesizer in communication with an input of the mixer, the synthesizer in communication with the processor, wherein the synthesizer generates and feeds a local signal at a set frequency to the mixer; a surface acoustic wave (SAW) filter in signal communication with an output of the mixer, wherein the SAW filter rejects any IF signal generated due to a received RF signal, and improves an accuracy and resolution of a detected interference frequency; an RF detector in communication with an output of the SAW filter, wherein the RF detector detects an amplitude and frequency of signal samples; and wherein the ADC is in signal communication with an output of the RF detector, the ADC in operative communication with the processor, wherein the ADC converts the signal samples to digital samples that are sent to the processor.

Example 16 includes the method of any of Examples 11-15, wherein the radio receiver is in a narrowband radio.

Example 17 includes the method of any of Examples 11-15, wherein the radio receiver is in a wideband radio.

From the foregoing, it will be appreciated that, although specific embodiments have been described herein for purposes of illustration, various modifications may be made without deviating from the scope of the disclosure. Thus, the described embodiments are to be considered in all respects only as illustrative and not restrictive. In addition, all changes that come within the meaning and range of equivalency of the claims are to be embraced within their scope.

What is claimed is:

1. A system comprising:
    a radio receiver including at least one antenna configured to receive one or more radio frequency (RF) signals, the radio receiver comprising:
        a first set of one or more tunable RF notch filters configured to receive a desired RF signal and reject an interference signal;
        a low-noise amplifier (LNA) in signal communication with an output of the one or more tunable RF notch filters;
        a splitter in signal communication with an output of the LNA; and
        a processor in operative communication with the one or more tunable RF notch filters;
    wherein a received RF signal from the output of the LNA is divided by the splitter and directed along a main signal path and an interference detection path;
    wherein the interference detection path comprises:
        a first mixer in signal communication with a first output of the splitter and configured to convert the received RF signal from the splitter to an intermediate frequency (IF) band;
        a first synthesizer in signal communication with an input of the first mixer, the first synthesizer in operative communication with the processor;
        a surface acoustic wave (SAW) filter in signal communication with an output of the first mixer, wherein the SAW filter is configured to reject any IF signal generated due to the received RF signal, and to improve an accuracy and resolution of a detected interference frequency;
        an RF detector in signal communication with an output of the SAW filter; and
        a first analog-to-digital converter (ADC) in signal communication with an output of the RF detector, the first ADC in operative communication with the processor;
    wherein the processor is operative to estimate the interference frequency based on a detected amplitude of signal samples from the first ADC and a synthesizer tuned frequency for that amplitude, wherein if the detected amplitude of the signal samples is more than a threshold defined limit, then the processor sends a control signal to configure the one or more RF notch filters at the interference frequency.

2. The system of claim 1, wherein the main signal path comprises:
    a second set of one or more tunable RF notch filters in signal communication with a second output of the splitter;
    a second mixer in signal communication with an output of the second set of one or more tunable RF notch filters, the second mixer configured to convert the received RF signal, from the second set of one or more tunable RF notch filters, to an IF band;
    a second synthesizer in signal communication with an input of the second mixer, the second synthesizer in operative communication with the processor;
    one or more tunable IF notch filters in signal communication with an output of the second mixer;
    an IF amplifier in signal communication with the one or more tunable IF notch filters; and
    a second ADC in signal communication with an output of the IF amplifier, the second ADC in operative communication with the processor.

3. The system of claim 2, further comprising:
    a digital potentiometer in operative communication with the processor, wherein the digital potentiometer is operative to send a control signal to the first and second sets of one or more tunable RF notch filters, and the one or more tunable IF notch filters.

4. The system of claim 1, wherein the processor includes a level detector and interference frequency finder module, which includes instructions executable by the processor, to perform an interference detection and rejection method comprising:
estimating the interference frequency based on the detected amplitude of signal samples from the first ADC and the synthesizer tuned frequency from the first synthesizer for the detected amplitude;
if the detected amplitude of the signal samples is more than the threshold defined limit, sending the control signal to configure the first and second sets of one or more RF notch filters at the interference frequency.

5. The system of claim 1, wherein the radio receiver is mounted in a vehicle.

6. The system of claim 5, wherein the vehicle is an aircraft.

7. The system of claim 5, wherein the vehicle comprises an urban air mobility (UAM) vehicle, or an unmanned aircraft systems (UAS) vehicle.

8. The system of claim 5, wherein the vehicle comprises business and general aviation (BGA) aircraft, or regional aircraft.

9. The system of claim 1, wherein the radio receiver is configured in a narrowband radio.

10. The system of claim 1, wherein the radio receiver is configured in a wideband radio.

11. A method for signal interference detection and rejection, the method comprising
providing a radio receiver onboard a vehicle for receiving one or more radio frequency (RF) signals, the radio receiver comprising a plurality of tunable RF notch filters that receive a desired RF signal and reject an interference signal, and a processor operatively coupled with the tunable RF notch filters;
wherein the radio receiver includes an interference detection path comprising:
a mixer that converts the received one or more RF signals to an intermediate frequency (IF) band;
a surface acoustic wave (SAW) filter in communication with an output of the mixer, wherein the SAW filter rejects any IF signal generated due to the one or more received RF signals; and
an RF detector in communication with an output of the SAW filter;
wherein the processor includes a level detector and interference frequency finder module that performs an interference detection and rejection method comprising:
estimating an interference frequency based on a detected amplitude of signal samples from an analog-to-digital converter (ADC) and a synthesizer tuned frequency for the detected amplitude;
if the detected amplitude of the signal samples is more than a threshold defined limit, sending a control signal to configure the RF notch filters at the interference frequency.

12. The method of claim 11, wherein the vehicle is an aircraft.

13. The method of claim 11, wherein the vehicle comprises an urban air mobility (UAM) vehicle, or an unmanned aircraft systems (UAS) vehicle.

14. The method of claim 11, wherein the vehicle comprises business and general aviation (BGA) aircraft, or regional aircraft.

15. The method of claim 11, wherein:
the mixer is in signal communication with a splitter so as to receive a portion of the one or more RF signals, wherein the mixer converts the portion of the one or more RF signals the IF band;
a synthesizer is in communication with an input of the mixer, the synthesizer in communication with the processor, wherein the synthesizer generates and feeds a local signal at a set frequency to the mixer;
the SAW filter improves an accuracy and resolution of a detected interference frequency;
the RF detector detects an amplitude and frequency of signal samples; and
the ADC is in signal communication with an output of the RF detector, the ADC in operative communication with the processor, wherein the ADC converts the signal samples to digital samples that are sent to the processor.

16. The method of claim 11, wherein the radio receiver is in a narrowband radio.

17. The method of claim 11, wherein the radio receiver is in a wideband radio.

18. A method for signal interference detection and rejection, the method comprising
providing a radio receiver onboard a vehicle for receiving one or more radio frequency (RF) signals, the radio receiver comprising a plurality of tunable RF notch filters that receive a desired RF signal and reject an interference signal, and a processor operatively coupled with the tunable RF notch filters;
wherein the radio receiver includes an interference detection path comprising:
a mixer that converts the received one or more RF signals to an intermediate frequency (IF) band;
a synthesizer in communication with an input of the mixer, the synthesizer in communication with the processor;
a surface acoustic wave (SAW) filter in communication with an output of the mixer, wherein the SAW filter rejects any IF signal generated due to the one or more received RF signals;
an RF detector in communication with an output of the SAW filter; and
an analog-to-digital converter (ADC) in communication with an output of the RF detector;
wherein the processor includes a level detector and interference frequency finder module that performs an interference detection and rejection method comprising:
estimating an interference frequency based on a detected amplitude of signal samples from the ADC and a tuned frequency from the synthesizer for the detected amplitude of signal samples;
if the detected amplitude of the signal samples is more than a threshold defined limit, sending a control signal to configure the RF notch filters at the interference frequency.

19. The method of claim 18, wherein:
the mixer is in communication with a splitter so as to receive a portion of the one or more RF signals, wherein the mixer converts the portion of the one or more RF signals to the IF band;
the synthesizer generates and feeds a local signal at a set frequency to the mixer;
the SAW filter improves an accuracy and resolution of a detected interference frequency;
the RF detector detects an amplitude and frequency of signal samples; and the ADC is in operative communication with the processor, wherein the ADC converts the signal samples to digital samples that are sent to the processor.

20. The method of claim 18, wherein the vehicle is an aircraft.

\* \* \* \* \*